(12) United States Patent
Hester et al.

(10) Patent No.: US 7,114,621 B2
(45) Date of Patent: *Oct. 3, 2006

(54) MEMBRANE MODULE ELEMENTS

(75) Inventors: Jonathan F. Hester, Hudson, WI (US); Brian E. Spiewak, Inver Grove Heights, MN (US); James S. Mrozinski, Oakdale, MN (US); James M. Nelson, Roseville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 235 days.

This patent is subject to a terminal disclaimer.

(21) Appl. No.: 10/437,799

(22) Filed: May 14, 2003

(65) Prior Publication Data
US 2003/0203183 A1    Oct. 30, 2003

Related U.S. Application Data

(63) Continuation-in-part of application No. 10/017,632, filed on Dec. 14, 2001.

(51) Int. Cl.
*B01D 29/07* (2006.01)

(52) U.S. Cl. ............. 210/490; 210/506; 210/640; 210/510.1; 96/6; 96/11; 95/46; 428/316.6; 428/319.3; 428/319.7; 428/182

(58) Field of Classification Search ............ 210/615, 210/605, 903, 906, 486, 321.74, 321.75; 428/316.6, 319.3, 319.7, 182
See application file for complete search history.

(56) References Cited

U.S. PATENT DOCUMENTS

| | | | |
|---|---|---|---|
| 3,847,657 A | 11/1974 | Rieber et al. | |
| 4,181,604 A | 1/1980 | Onishi et al. | |
| 4,333,779 A | 6/1982 | Rinker et al. | |
| 4,416,993 A | 11/1983 | McKeown | |
| 4,539,256 A | 9/1985 | Shipman | |
| 4,746,435 A | 5/1988 | Onishi et al. | |
| 4,834,881 A | 5/1989 | Sawada et al. | |
| 4,954,256 A * | 9/1990 | Degen et al. | 210/490 |
| 5,015,379 A | 5/1991 | Drori | |
| 5,116,506 A | 5/1992 | Williamson et al. | |
| 5,127,925 A | 7/1992 | Kulprathipanja et al. | |
| 5,156,780 A | 10/1992 | Kenigsberg et al. | |
| 5,217,802 A * | 6/1993 | Scarmoutzos | 428/304.4 |
| 5,254,143 A * | 10/1993 | Anazawa et al. | 95/46 |

(Continued)

FOREIGN PATENT DOCUMENTS

EP    0197024    10/1986

(Continued)

OTHER PUBLICATIONS

Keth Brindle, Tom Stephenson, Michael J. Semmens, "Pilot-Plant Treatment of a High-Strength Brewery Wastewater Using a Membrane-Aeration Bioreactor," Water Environment Research, vol. 71, No. 6, pp. 1197-1204 (Sep./Oct. 1999).

(Continued)

*Primary Examiner*—Hai Vo
(74) *Attorney, Agent, or Firm*—Douglas B. Little

(57) ABSTRACT

A layered sheet construction contains at least one gas permeable, liquid water impermeable layer, and a gas delivery layer formed of a corrugated sheet proximate the gas permeable, water impermeable layer. The corrugated sheet has corrugations that form flow channels through which gas can be conveyed to the gas permeable layer. One embodiment of the layered sheet construction includes a gas permeable, liquid water impermeable layer having a surface energy that is below 20 dynes per centimeter.

3 Claims, 1 Drawing Sheet

U.S. PATENT DOCUMENTS

| | | | |
|---|---|---|---|
| 5,260,360 | A | 11/1993 | Mrozinski et al. |
| 5,286,279 | A | 2/1994 | Wu |
| 5,352,513 | A | 10/1994 | Mrozinski et al. |
| 5,670,573 | A | 9/1997 | Kirchner et al. |
| 5,690,949 | A | 11/1997 | Weimer et al. |
| 5,738,111 | A | 4/1998 | Weimer et al. |
| 5,876,604 | A | 3/1999 | Nemser et al. |
| 5,989,698 | A | 11/1999 | Mrozinski et al. |
| 6,280,824 | B1 * | 8/2001 | Insley et al. ............... 428/172 |
| 6,322,703 | B1 * | 11/2001 | Taniguchi et al. .......... 210/636 |
| 6,355,081 | B1 | 3/2002 | Wang et al. |
| 6,558,549 | B1 | 5/2003 | Cote et al. |
| 2003/0104192 | A1 | 6/2003 | Hester et al. |
| 2004/0188351 | A1 * | 9/2004 | Thiele et al. |

FOREIGN PATENT DOCUMENTS

| | | |
|---|---|---|
| EP | 0526823 | 2/1993 |
| EP | 0 840 072 A2 | 5/1998 |
| EP | 1 142 702 A1 | 10/2001 |
| WO | 97/44508 | 11/1997 |
| WO | 99/65542 | 12/1999 |
| WO | 99/65595 | 12/1999 |
| WO | WO 200044472 A1 * | 8/2000 |

OTHER PUBLICATIONS

John T. Cookson, Jr., Bioremediation Engineering: Design and Application, McGraw-Hill, Inc., 1995, Chapter 8, pp. 305-358, and Chapter 9, pp. 359-432.

Y. Suzuki et al., "Oxygen Supply Method Using Gas Permeable Film For Wastewater Treatment," Wat. Sci Tech., vol. 28, No. 7 pp. 243-250, 1993.

M. Pankhania et al., Hollow Fibre Bioractor For Wastewater Treatment Using Bubbleless Membrane Aeration, Wat. Res., vol. 28, No. 10, pp. 2233-2236, 1994.

Pierre Cote et al, "Bubble-Free Aeration Using Membranes: Process Analysis," Journal WPCF, vol. 60, No. 11, pp. 1986-1992, Nov. 1988.

Pierre Cote, "Bubble-Free Aeration Using Membranes: Mass Transfer Analysis," Journal of Membrane Science, 47 (1989) 91-106.

Keith Brindle et al., "The Application of Membrane Biological Reactors for the Treatment of Wastewaters," Biotechnology and Bioengineering, vol. 49, pp. 601-610 (1996).

E. Casey et al., "Review of Membrane Aerated Biofilm Reactors," Resources, Conservation and Recycling 27 (1999) 203-215.

D'Augstino et al., "Chemical Mechanisms in $C_3F_8$-$H_2$ Radiofrequency Discharges", Plasma Chemistry and Plasma Processing 4, 21-30, 1984.

Ito et al., "pH-Sensitive Gating by Conformational Change of a Polypeptide Brush Grafted onto a Porous Polymer Membrane", Journal Am. Chem. Soc., 119, 1619-1623 (1997).

Akhtar et al., "Coatings reduce the fouling of microfiltration membranes", J. Membr. Sci., 107, 209-218 (1995).

Iwata et al, "Preparation of Anti-Oil Stained Membrane by Grafting Polyethylene Glycol Macromer onto Polysulfone Membrane", J. Appl. Polym. Sci., 54, 125-128 (1994).

Iwata et al., "Preparation and Properties of Novel Environment-Sensitive Membranes Prepared by Graft Polymerization onto a Porous Membrane", J. Membr. Sci., 38, 185-199 (1988).

Thom et al., "Photochemical Frafting of Poly(Ethylene Glycol)s Yielding Low-Protein-Adsorbing UF Membranes", Acta Polytech. Scand., Chem. Technol. Metall. Ser., 247, 35-50 (1997).

Ulbricht et al., "Photo-induced graft polymerization surface modifications for the preparation of hydrophoilic and low-protein-adsorbing ultrafiltration membranes", J. Membr. Sci., 115, 31-47 (1996).

Mok et al., "Surface Modification of Polyethersulfone Hollow-Fiber Membranes by γ-Ray Irradition", J. Appl. Polym. Sci., 51,193-199 (1994).

Hautojarvi et al., "Characterization of Graft-Modified Porous Polymer Membranes", Ind. Eng. Chem. Res., 35, 450-457 (1996).

Hunt et al., "End-Functionalized Polymers. 1. Synthesis and Characterization of Perfluoroalkyl-Terminated Polymers via Chorosilane Derivatives", Macromolecules, 26, 4854 (1993).

Elman et al., "A Neutron Reflectivity Investigation of Surface and Interface Segregation of Polymer Functional End Groups", Macromolecules, 27, 5341 (1994).

Affrossman et al., "Surface Segregation in Blends of Hydrogenous Polystyrene and Perfluorohexane End-Capped Deuterated Polystyrene, Studied by SSIMS and XPS", Macromolecules, 27, 1588 (1994).

Schaub et al., "Surface Modification via Chain End Segregation in Polymer Blends", Macromolecules, 29, 3982-3990, (1996).

U.S. Appl. No. 10/159,752, filed May 29, 2002, "Fluid Repellent Microporous Materials".

* cited by examiner

MEMBRANE MODULE ELEMENTS

CROSS-REFERENCE TO RELATED APPLICATIONS

The present application is a continuation in part of application Ser. No. 10,017,632 filed on Dec. 14, 2001.

TECHNICAL FIELD

The present invention generally relates to a membrane module element for use in membrane aerated bioreactors (MABRs). More specifically, the present invention relates to a membrane module element having at least one gas permeable, liquid water impermeable layer proximate a gas delivery layer.

BACKGROUND

Water treatment processes commonly use microbes, mainly bacteria, to catalyze the degradation of unwanted material in wastewater. A feature common to many wastewater treatment processes is the provision of oxygen to a population of microbes. Membrane aerated bioreactors (MABRs), wherein a fixed microbial layer is supported on a gas permeable, water impermeable membrane and oxygen or other gases are fed to the microbes directly through the membrane, have been suggested as an advantageous, fixed biomass process for wastewater treatment. Both hollow fiber and flat sheet type membrane elements, similar to those used in water filtration applications, have been suggested for use in MABRs.

DISCLOSURE OF INVENTION

The present invention includes a layered sheet construction containing at least one gas permeable, liquid water impermeable layer, and a gas delivery layer formed of a corrugated sheet proximate the gas permeable, water impermeable layer. The corrugated sheet has corrugations that form flow channels through which gas can be conveyed to the gas permeable layer. The present invention further includes a layered sheet construction having a surface energy that is below 20 dynes per centimeter.

DETAILED DESCRIPTION

The layered sheet construction of the present invention includes a membrane layer attached to a corrugated support sheet for use in membrane aerated bioreactors.

As used herein, the term "microporous" refers to films, membranes or film layers having average pore sizes of 0.05 to 3.0 micrometers as measured by bubble point pore size ASTM-F-316-80.

As used herein, the term "ultraporous" refers to films, membranes or film layers having average pore sizes of 0.001 to 0.05 microns as measured by bubble point pore size ASTM-F-316-80.

As used herein, the term "hydrophobic" means microporous membrane materials which are not wet by liquid water or polar solvents, and which are capable of repelling and preventing the passage of liquid water through their structure.

As used herein, the term "hydrophilic" means having a strong tendency to bind or absorb water.

As used herein, the term "oleophobic" means microporous membrane materials that are not wet by low surface energy fluids like oils, greases or hydrocarbon solvents. The term "oleophobic" is also meant to include repelling or tending not to combine with oil or grease.

As used herein, the term "corrugated" means having a shape of folds or parallel and alternating ridges and grooves. Corrugations include saw tooth and sinusoidal profiles and other profiles that include alternating ridges and grooves.

As used herein, the term "water-impermeable" means being impermeable to liquid water under conditions of standard temperature and pressure.

As used herein, the term "macromolecular additive" refers to an additive that contains a fluorochemical molecule having at least 8 carbons, such as a fluoropolymer. Furthermore, it is to be understood that the term "macromolecular additive" includes the reaction product of one or more aliphatic polyfunctional compounds having reactive hydroxyl and/or acyl functional groups, one or more fluorochemical monofunctional compounds and/or one or more aliphatic monofunctional compounds having 12 to 72 carbon atoms.

As used herein, the term "porous membrane" refers to a structure that includes a multiplicity of pores or holes which permit selective transport of at least one constituent of a fluid mixture through the structure while selectively precluding transport of other constituent(s).

As used herein, the term "microbial support layer" refers to a layer to which a mass of microbes can be attached or adhered and function in a selective manner.

Figure 1:
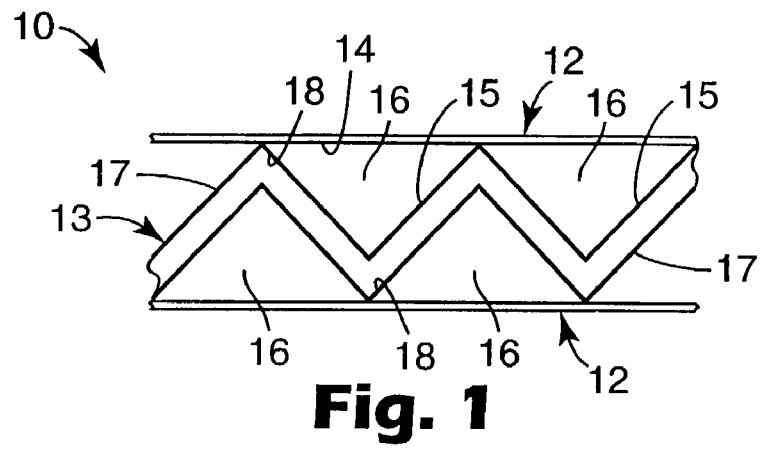
FIG. 1 is a partial cross-sectional view of a layered sheet construction in accordance with the present invention.

As illustrated in FIG. 1, the layered sheet construction 10 includes a gas permeable, liquid water impermeable layer 12 attached to gas delivery layer 13 in the form of a corrugated sheet at a base surface 14 of gas permeable layer 12. The corrugated sheet of gas delivery layer 13 includes a plurality of walls 15 and a plurality of discrete flow channels 16 which allow for the delivery of a gas, such as an oxygen-containing gas, to the base surface 14 of gas permeable layer 12.

The gas permeable layer 12 permits transmission or passage of a gas through gas permeable layer 12. Although descriptions of the invention are primarily made in terms of a preferred gas permeable layer 12 that permits passage of gas through the gas permeable layer, any other vapor, or moisture vapor permeable layer may be substituted in place of, or in combination with, a preferred gas permeable layer while still realizing benefits of the invention.

The gas permeable layer 12 is microporous or ultraporous with pore sizes that may range from about 0.001 to about 3.0 micrometers. Preferably, the pore size of the gas permeable layer 12 is less than about 0.5 micrometers. The preferred pore size maximum prevents microbes in wastewater from permeating the gas permeable layer 12 or growing in the layer 12. Additionally, gas permeable layer 12 may be substantially nonporous yet sufficiently permeable to the gas of interest such that passage through the nonporous layer by diffusion is observed.

The gas permeable layer 12 of the present invention is generally made from gas permeable, liquid water impermeable materials. Some examples of materials that may be used as part of the gas permeable layer 12 include polyethylene, polypropylene, and copolymers thereof, polysulfone, polyethersulfone, polyarylsulfone, and copolymers thereof, fluororesins like polytetrafluoroethylene and poly(vinylidene fluoride), silicone-based materials, such as poly(dimethyl siloxane) or silicone rubber, any other material that can be made gas permeable and liquid water impermeable, or any other combination thereof.

In general, any suitable technique and apparatus that is useful for preparing gas permeable, liquid water impermeable membranes may be used to manufacture the gas permeable layer 12. As an example, the gas permeable layer 12 may be prepared using thermally induced phase transition (TIPT) or thermally induced phase separation (TIPS) processes, described in U.S. Pat. No. 4,539,256 (Shipman), U.S. Pat. No. 4,726,989 (Mrozinski), U.S. Pat. No. 4,867,881 (Kinzer), U.S. Pat. No. 5,120,594 (Mrozinski), and U.S. Pat. No. 5,238,623 (Mrozinski), which are incorporated herein by reference.

TIPT processes are particularly well suited for forming the gas permeable layer of the present invention. TIPT processes are used to form semi-crystalline, flat sheet, microporous membranes that have gas transfer and durability suitable for the present invention. TIPT membranes can have pore sizes in the range of about 0.05 to about 1.0 micrometer and air permeability in the range of about 0.7 to 34.0 kilograms per meter per hour (kg/m-h) in water that are sufficient for gas permeable layer 12. Similarly, gas permeable layer 12 may be made using a wet casting technique, such as disclosed in U.S. Pat. No. 3,432,585, which is incorporated herein by reference.

Alternatively, commercially available gas permeable, water impermeable membranes may be used as the gas permeable layer 12 of the present invention. For example, a microporous membrane prepared by orientation of an extruded polyolefin film loaded (filled) with an inorganic filler, such as the microporous membrane described in U.S. Pat. No. 5,176,953 (Jacoby et al.), U.S. Pat. No. 5,236,963 (Jacoby et al.), and U.S. Pat. No. 5,317,035 (Jacoby et al.) is suitable for use as the gas permeable layer 12.

Likewise, microporous membranes suitable for use as gas permeable layers 12 in include those prepared from compositions that include polypropylene or copolymers thereof, and a beta-spherulite nucleating agent such as membranes disclosed in U.S. Pat. No. 5,134,174 (Xu et al.), U.S. Pat. No. 5,317,035 (Jacoby et al.), and EP 0,492,942 (Jacoby et al.).

The gas delivery layer 13 of the present invention allows for the delivery of gas to the gas permeable layer to which it is proximate. During operation, gas moves along the gas delivery layer 13 to the base surface 14 of the gas permeable layer 12 so that gas transfer or diffusion through the gas permeable layer 12 can occur.

In preferred embodiments, the gas delivery layer 13 includes discrete or separate flow channels 16 that enhance the durability of the layered sheet construction 10. For example, discrete flow channels 16 of the gas delivery layer 13 prevent complete flooding of the layered sheet construction 10 if any area of the layered sheet construction 10 is punctured. If any area of the gas permeable layer 12 is punctured by debris present in wastewater, for example, discrete flow channels 16 make it possible for only one or a very small number of flow channels 16 of the gas delivery layer 12 to become flooded. Therefore, damage due to punctures is localized. On the other hand, conventional layered sheet constructions that do not contain discrete flow channels, such as (1) membrane constructions in which the membrane layer is spot-bonded onto a support layer, or (2) membrane constructions that include screens, porous felts, or fabrics, would suffer from flooding of the support layer that results in disablement of conventional layered sheet constructions.

The flow channels 16 through which gas is delivered to the base surface 14 of the gas permeable layer 12 may or may not extend along the entire length (not shown) of gas delivery layer 13. While the flow channels are depicted as linear in the present invention, alternative shapes or configurations are permissible as long as gas can be delivered to the gas permeable layer 12 effectively.

In general, techniques such as profile extrusion, extrusion replication or microreplication, or cast and cure methods, are useful for preparing preferred gas delivery layers of the invention comprising flow channels. As an example, corrugation of a flat sheet is a suitable technique for making a gas delivery layer having channels in accordance with preferred embodiments of the present invention. U.S. patent application No. 2002/0154406 A1 (Merrill et al.), incorporated herein by reference, describes an exemplary method for corrugating a flat polymer film which would be suitable for preparing corrugated gas delivery layers of the present invention. Other methods of corrugation are possible as well. Another example of a preferred gas delivery layer of this invention is one which comprises a base having a side on which there are a plurality of walls substantially perpendicular to the base, the walls forming flow channels therebetween.

Alternatively, acceptable gas delivery layers that do not comprise flow channels include foams, porous materials, woven, and non-woven fabrics. Methods to make these alternative gas delivery layers are many and varied, and are known in the art. It is necessary that the gas delivery layer 14 provide a means for gas to reach the base surface 13 of the gas permeable layer 12, so that gas transfer or diffusion through gas permeable layer 12 can occur.

The gas delivery layer and gas permeable layer may be affixed or attached to one another through various means, such as adhesive bonding, thermal bonding, ultrasonic bonding, pressure bonding, solvent bonding, chemical bonding, and the like. In one embodiment of the present invention, the gas delivery layer 13 is made of a bonding layer 17 proximate a base layer 18. The bonding layer 17 may comprise an adhesive or a low-melting resin, which facilitates the adhesive or thermal bonding of the gas delivery layer 13 to the gas permeable layer 12. Some examples of materials that may be used to form the bonding layer 17 of gas delivery layer 13 include polyolefin elastomers, ethylene vinyl acetate copolymers, ethylene vinyl acetate terpolymers, styrene-ethylene/butylene-styrene block copolymers, polyurethanes, polybutylene, polybutylene copolymers, polyisoprene, polyisoprene copolymers, acrylate, silicones, natural rubber, polyisobutylene, butyl rubber, and mixtures thereof. Some examples of materials that may be used to form the base layer 18 of gas delivery layer 13 include polypropylene, polyethylene, polycarbonate, polyurethane, fluoropolymers, polystyrene, acrylonitrile-butadiene-styrene copolymers, polyurethanes, nylons, and copolymers and blends thereof.

Virtually any melt processable or sinterable polymer resin may be used to form the base layer 18 of gas delivery layer 13.

Figure 2:
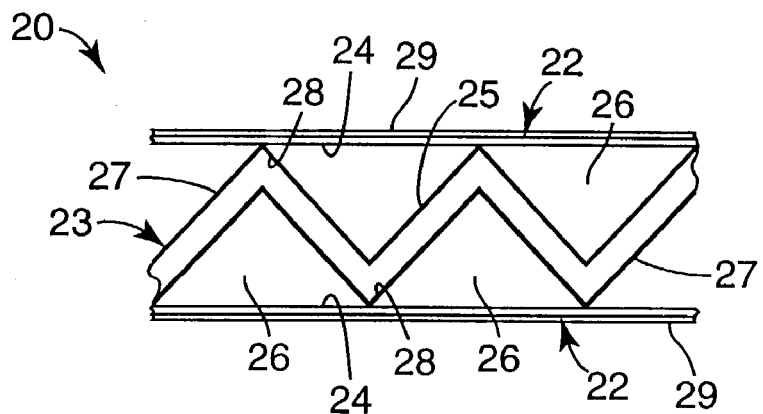
FIG. 2 is a partial cross-section view of an alternate embodiment of a layered sheet construction that includes a microbial layer.

In one embodiment of the present invention, a microbial population 29 that includes aerobic microorganisms may be attached to the gas permeable layer 22, as depicted in FIG. 2. The microbial population may also include a mixed culture of aerobic and anaerobic microorganisms that are effective to treat an aqueous medium contaminated with an organic substance(s) and/or a nitrogen-containing substance (s). Preferably, when treating an aqueous medium that includes both organic and nitrogen-containing substances, a microbial population 29 containing both aerobic and anaerobic microorganisms is used.

Microorganisms used in wastewater treatment applications typically originate from, and are naturally indigenous to, the wastewater or contaminated water source. In some cases, seed bacteria may be added to wastewater or aqueous medium to accelerate development of a biofilm or control the composition of the microbial population. Some examples of microorganisms that may be included as part of microbial population 29 include *Bacillus, Arthrobacter, Nitrosomonas*, and *Nitrobacter* bacteria or any other suitable bacteria, fungus or microbial agent that is effective to degrade undesired components present in wastewater. (See, J. T. Cookson, Jr., *Bioremediation Engineering Design and Application*, New York: McGraw-Hill, Inc., 1995).

If the microbial population includes both aerobic and anaerobic bacteria, the aerobic bacteria will be localized closer to the gas permeable layer 12 (farther away from the aqueous medium), while the anaerobic bacteria will be localized farther away from the gas permeable layer 12 (closer to the exterior of the microbial population or aqueous medium containing the organic substances and/or nitrogen-containing substances).

Figure 3:
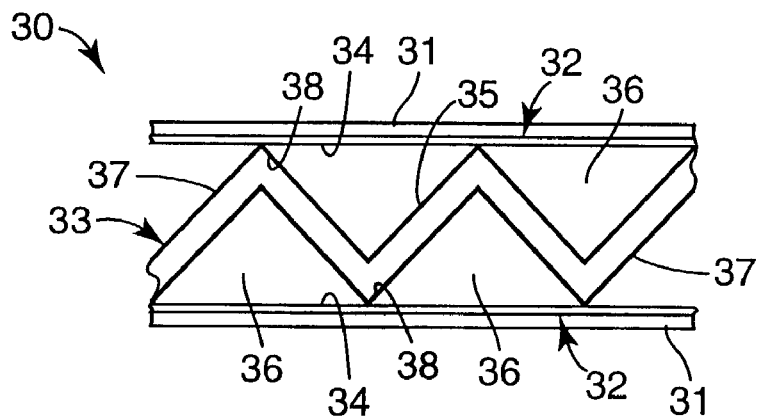
FIG. 3 is a partial cross-section view of another embodiment of the layered sheet construction that includes a microbial support layer.

Layered sheet construction 30 may optionally include a microbial support layer 31 that is proximate or connected to, the gas permeable layer 32 on the side opposite to the gas delivery layer 34, as depicted in FIG. 3. The microbial support layer 31 serves as a support to which microbes are attached in order to facilitate wastewater treatment when practicing the present invention. Support layer 31 may also increase the durability of the layered sheet construction 30 by protecting the gas permeable layer 32 from tearing and/or punctures.

The microbial support layer 31 may be made of any material (e.g., fibrous or porous) having a surface suitable for microbial adhesion and support. Examples of materials of construction for support layer 31 are polymeric or non-polymeric non-woven webs, such as air-laid, carded, stitch-bonded, spun-bonded, spun-laced, ultrasonically bonded, wet-laid, or melt-blown non-woven webs; woven and knitted materials, foams, perforated materials, and porous ceramics. In addition, foams suitable for use as microbial support layers 31 include those prepared by polymerizing high internal phase emulsions (HIPEs), as described in U.S. Pat. No. 5,899,893 (Dyer et al.), U.S. Pat. No. 6,147,131 (Mork et al.), and U.S. Pat. No. 6,274,638 (Yonemura et al), and in WO 01/21693 (Thunhorst et al.), which are incorporated herein by reference.

The microbial support layer 31 may be designed to have an open cell size that is suitable for microbial in-growth. In that case, microbes grow or form inwardly on the microbial support layer 31. The microbial support layer 31 can be made hydrophilic by techniques known in the art. Such techniques include coating methods, surface graft-polymerization of hydrophilic polymer chains onto the support layer 31, ionizing radiation or the like, incorporation of surface-active additives, or loading (filling) the support layer 31 with hydrophilic and/or absorptive filler materials.

Additionally, the support layer 31 may have surface chemistry favorable for microbial attachment and/or adhesion, or may be loaded or coated with particles, fibers or resins having such a surface chemistry. For example, as most bacteria have a net negative surface charge, the support layer 31 could preferably carry a permanent, positive surface charge. Examples of materials carrying a net positive surface charge which might be used to fabricate a microbial support layer 31 include polyurethane resins having built-in cationic or cation-forming chemical groups. Alternatively, addition of a surface-active additive that provides a positive charge to the base polymer used to fabricate support layer 31 is a suitable technique for modifying the support layer 31 to enhance microbial attachment.

The thickness of the optional microbial support layer 31 may be any thickness that is functional for supporting the microbial population. The thickness of the support layer 31 may allow for control of the thickness of the microbial population that adheres to and grows within or on support layer 31. This may be preferred for controlling the thickness of the microbial population by adjusting the reactor conditions so as to remove any portion of the microbial population exceeding the thickness of the microbial support layer. For example, shear forces might be induced at the surface of the microbial support layer through the motion of air bubbles or water tangentially to the surface of the microbial support layer, removing microbes which grow outside of it.

Wastewater typically includes low surface energy fluids such as oil, grease, solvents, and surfactant-like molecules that can cause membrane wet-out over time. Therefore, reducing wetting of the gas permeable layer by increasing its resistance to absorption of surfactants and low surface energy fluids like oil or grease over time is desirable so that membrane gas delivery efficiency and life is maximized. One method to increase the wetting resistance of the gas permeable layer 12 is to reduce its surface energy, making it oleophobic. Generally, the resistance of a surface to wetting by surfactants and low surface energy fluids increases as the surface energy of the surface decreases.

If the material used to form the gas permeable layer 12 is not sufficiently oleophobic, the oleophobicity can generally be improved by incorporation of fluorine-containing chemical groups in a near-surface region of the gas permeable layer 12. Incorporation of fluorine-containing chemical groups in the near-surface region of the gas permeable layer 12 to produce a gas permeable layer 12 having improved oleophobicity or reduced surface energy can be accomplished by: (1) incorporation of small-molecule or macromolecular fluorinated additives in the bulk polymer composition used to prepare the gas permeable layer; (2) coating the finished gas permeable layer 12 with a composition comprising fluorinated chemical groups; (3) exposure of the gas permeable layer 12 surface to ionizing radiation or a plasma discharge in the presence of a gaseous fluorinated species; (4) graft polymerization of fluorinated chemical groups onto or within the gas permeable layer 12, comprising the steps of providing a gas permeable layer 12 and a polymerizable chemical group comprising fluorine, and initiating production of reactive groups on either the gas permeable layer, the polymerizable chemical group, or both to effect polymerization and/or graft polymerization of the polymerizable chemical group on or within the gas permeable layer in the vicinity of its surface.

U.S. Pat. No. 5,260,360 (Mrozinski & Seppala; 1993) and U.S. Pat. No. 5,352,513 (Mrozinski & Seppala; 1994), incorporated by reference herein, describe the preparation of oleophobic thermally induced phase separation (TIPS) membranes (useful as the gas permeable, water impermeable layer 12) from compositions that include a crystallizable polyolefin and a fluorochemical oxazolidinone as a melt additive or as a constituent in a topical coating. Fluorochemical oxazolidinones are described in U.S. Pat. No. 5,025,052 (Crater, et al.; 1991) incorporated by reference herein.

U.S. Pat. No. 5,690,949 (Weimer, et al.; 1997) and U.S. Pat. No. 5,738,111 (Weimer, et al.; 1998), incorporated herein by reference, describe oleophobic TIPS viral barrier membranes that include a thermoplastic polymer and one or more oil-repellant fluorochemical compounds as a melt additive or as a constituent in a topical coating. These membranes are also useful as the gas permeable, water impermeable layer 12. Preferred fluorochemical compounds include fluorochemical oxazolidinones, fluorochemical aminoalcohols, fluorochemical piperazines, fluoroacrylate polymers, fluorochemical acrylic esters, amorphous fluoropolymers, or combination thereof.

patent application Ser. No. 10/159,752, filed May 29, 2002, which is incorporated herein by reference, describes oleophobic TIPS membranes (useful as the gas permeable, water impermeable layer 12) that include a crystallizable olefin polymer and a fluorochemical additive prepared from the reaction product of one or more polyfunctional compounds having reactive hydroxy and/or acyl functional groups with one or more monofunctional fluorochemical compounds that include a fluoroalkyl group of 3–12 carbon atoms and a co-reactive hydroxyl or acyl group.

In addition to small-molecule bulk additives, macromolecular additives that include fluorinated chemical groups incorporated into the bulk composition may be used to prepare the gas permeable layer 12 having oleophobic properties. It is believed that when a small proportion of a fluorinated additive polymer is blended with a nonfluorinated, gas permeable membrane-forming matrix polymer, the fluorinated additive polymer becomes enriched or concentrated at the membrane surface upon heat treatment of the membrane at a temperature sufficient for polymer mobility. Surface enrichment of fluorinated polymeric additives in polymer blends has been observed (Hunt et al., *Macromolecules* 1993, 26, 4854; Elman et al., *Macromolecules* 1994, 27, 5341; Affrossman et al., *Macromolecules* 1994, 27, 1588; Schaub et al., *Macromolecules* 1996, 29, 3982–3990), and occurs as a result of the propensity of the system to minimize surface free energy.

Addition of fluorochemical additives (which may or may not be polymeric) to a composition used to prepare the gas permeable layer 12 may include use of fluorochemical additives in the preparation of TIPS membranes used for gas permeable layer 12 as disclosed in U.S. Pat. Nos. 5,260,360, 5,352,513, 5,690,949, and 5,738,111.

The surface energy of a gas permeable layer 12 may be reduced through the grafting of fluorinated chemical groups onto or within the gas permeable layer 12, by the steps of providing a gas permeable layer 12 and a polymerizable chemical group comprising fluorine, and initiating production of reactive groups on either the gas permeable layer, the polymerizable chemical group, or both to effect polymerization and/or graft polymerization of the polymerizable chemical group on or within the gas permeable layer in the vicinity of its surface. U.S. Pat. No. 5,156,780 (Kenigsberg and Shchori) describes an exemplary method for grafting fluorinated chemical groups onto porous substrates, which could be applied to gas permeable layers of the present invention. The described method comprises the steps of: (a) providing a fluoroacrylate monomer, (b) disposing the monomer in a carrier vehicle to form a mixture, (c) contacting the material of the porous substrate with the mixture thus impregnating the substrate with the monomer mixture, (d) removing substantially all of the carrier vehicle from the substrate, and (e) initiating polymerization of the fluoroactylate monomer using, for example, ultraviolet radiation or an electron beam. An initiator such as a thermally-initiated free-radical initiator may also be provided to initiate the polymerization reaction, as well as a crosslinker.

Other examples of surface modification of polymer membranes by in situ polymerization are in the literature. Various references describe the in situ polymerization of polymerizable chemical groups on or within polymer membranes by exposure to plasma (Ito et al., *J. Am. Chem. Soc.* 1997, 119, 1619–1623; Akhtar, et al., *J Membr. Sci.* 1995, 107, 209–218; Iwata et al., *J. Appl. Polym. Sci.* 1994, 54, 125–128; Iwata and Matsuda, *J. Membr. Sci.* 1988, 38, 185–199), ultraviolet (Thom et al., *Acta Polytech. Scand., Chem. Technol. Metall. Ser.* 1997, 247, 35–50; Ulbricht et al., *J. Membr. Sci.* 1996, 115, 31–47), gamma-ray (Mok et al., *J. Appl. Polym. Sci.* 1994, 51, 193–199), and electron beam (Hautojarvi et al, *Ind. Eng. Chem. Res.* 1996, 35, 450–457) radiation.

Although these references may not describe the in situ polymerization of chemical groups including fluorine, similar methods can be used to polymerize such chemical groups. Examples of polymerizable, fluorinated chemical groups include, but are not limited to, fluorinated acrylate monomers, fluorinated methacrylate monomers, fluorinated styrene monomers, and other fluorinated molecules comprising a chemical group capable of polymerization by free-radical generation or condensation reaction.

A list of materials which can be used to make gas delivery layers 12 suitable for the grafting of fluorinated chemical groups thereon includes polypropyelene, polyethylene, polysulfone, poly(ethersulfone), polyvinylidene fluoride, polytetrafluoroethylene, vinyl, polyamides, and polyurethanes, and blends or copolymers thereof. In addition to flat sheets, the above methods may be used to prepare oleophobic, gas permeable, tubular or hollow fiber membranes, tubular and hollow fiber membranes being well known in the art. Indeed, it is envisioned that the oleophobic, gas permeable layers of the present invention could be configured to operate as flat sheet membrane modules, tubular membrane modules, or hollow fiber membrane modules. In the case of tubular and hollow fiber membrane modules, no gas delivery layer would be required, as the tubular or hollow fibers acting as the gas permeable layer would be self-supporting. In these cases, the construction of a membrane module would simply require the provision of a means to deliver gas to the interior of the tubular or hollow fiber membranes.

Conventional oleophobic membranes prepared from materials like polytetrafluoroethylene (PTFE) (for example, Gore-Tex® membranes, available from W. L. Gore & Associates, Inc., Newark, Del. or PTFE membranes available from Tetratec Corp., Feasterville, Pa.) typically have surface energies that are more than 20 dynes per centimeter. While these membranes are acceptable in many cases as gas permeable layers, they can be wet-out by oils and other constituents present in some wastewater. U.S. Pat. No. 5,989,698 (Mrozinski et al.), incorporated herein by reference, describes the characterization of PTFE microporous membranes, which were found to wet-out with mineral oil, having a surface tension of 34.7 dynes per centimeter, within 30 s of contact. After coating with a curable, polyurethane composition comprising fluorinated chemical groups, however, these microporous membranes were resistant to wetting by mineral oil, and in fact resisted wetting by n-heptane, having a surface tension of 20.1 dynes per centimeter, for at least 30 s. Similarly, U.S. Pat. No. 5,260,360 (Mrozinski and Seppala) describes the preparation of polypropylene membranes having improved oleophobicity by the addition of fluorochemical additives to the bulk membrane casting composition. Polypropylene membranes prepared without the fluorochemical additive were observed to wet-out within 30 s of contact with mineral oil, having a surface tension of 34.7 dynes per centimeter. However, polypropylene membranes prepared with the addition of the fluorochemical additives were resistant to wetting by mineral oil, and in fact resisted wetting by a 65:35 mixture by weight of mineral oil and n-hexadecane, the latter having a surface tension of 27.5 dynes per centimeter, for at least 30 s.

Thus, by incorporating chemical groups in the near-surface region of polypropylene microporous membranes (unmodified polypropylene having a surface energy of 29–30 dynes per centimeter), it is possible to obtain membranes having enhanced oleophobicity relative to conventional PTFE membranes. Besides providing improved resistance to wetting by low surface energy fluids and surfactants, the techniques taught herein for making membranes oleophobic are advantageous for the preparation of the inventive gas permeable layers. Conventional PTFE membranes are often difficult to bond to other materials, like the gas delivery layer of the present invention. In contrast, the methods described herein enable the preparation of gas permeable layers having surface energies equal to or less than that of PTFE membranes, but nevertheless comprising a major proportion of non-fluorinated polymer, facilitating easier bonding of the gas permeable layer to the gas delivery layer.

To avoid membrane wet-out by low surface energy fluids when practicing the present invention, it is preferred that gas permeable layers 12 be manufactured to have surface energies of less than about 20 dynes per centimeter, preferably less than about 19 dynes per centimeter, and most preferably less than about 17 dynes per centimeter. All of the surface fluorination methods described herein, alone or in combination with one another, may be used to manufacture gas permeable membranes of the present invention having surface energies less than 20 dynes per centimeter, preferably less than about 19 dynes per centimeter, and most preferably less than about 17 dynes per centimeter. Other processes may be used to render the gas permeable layer 12 surface(s) oleophobic.

The invention will be further clarified by the following example which is not intended to limit the scope of the invention.

Gas Delivery Layer 1

A textured gas delivery layer having rail-like protrusions on one side was made using conventional profile extrusion equipment. A polypropylene/polyethylene impact copolymer (7C06, 1.5 MFI, Dow Chemical Corp., Midland, Mich.) and a polyolefin elastomer (ultra low density polyethylene) ENGAGE 8100 (Dupont Dow Elastomers, Wilmington, Del.) were coextruded to form a fluid impermeable support sheet having a flat base layer with rail-like protrusions with the upper most surface (tips) of the protrusions containing the low melting point heat sealable elastomer.

The polypropylene copolymer was extruded with a 6.35 cm single screw extruder (24:1 L/D) at a rate of approximately 27 kg/hr using a barrel temperature profile that steadily increased from 177° C. to 232° C. The polyolefin elastomer was fed at a rate of approximately 2.3 kg/hr into a second single screw extruder having a diameter of approximately 3.81 cm (28:1 L/D) and a temperature profile that increased from approximately 204° C. to 232° C. Both polymers were fed into a MASTERFLEX LD-40 film die (Production Components, Eau Claire, Wis.) maintained at a temperature of 232° C. The extrudate was extruded vertically downward through the die equipped with a die lip having a shaping profile. After being shaped by the die lip, the extrudate was quenched in a water tank at a speed of approximately 2.1 meter/min with the water being maintained at approximately 16° C.–20° C. The film die had a die lip having an opening cut by electron discharge machining configured to form a polymeric base sheet having a smooth surface on one side and a textured surface formed of evenly spaced features shaped as rail-like protrusions extending perpendicularly from the base layer on the opposite side. The equipment was configured so that the ENGAGE 8100 elastomer was extruded on the side of the die facing the evenly spaced features.

The base layer of the gas delivery layer had a thickness of about 102 microns (0.004 in) and was composed of the polypropylene copolymer. Each rail-like protrusion extended continuously along the base layer. The dimensions for each rail-like protrusion were approximately 965 microns (0.038 in) in height, a thickness of approximately 406 microns (0.016 in), and a center-to-center spacing of approximately 1016 microns (0.040 in). In addition, each rail-like protrusion had a layer of approximately 127 microns (0.005 in) in thickness of the low melting point ENGAGE 8100 at its distal end (tip). The low melting point resin comprised approximately 7.7% by weight of the multi-layer support sheet.

Gas Delivery Layer 2

A first gas delivery layer sheet having protrusions on one side of the sheet was extruded using the method described above for the Gas Delivery Layer 1 and wound into a roll. The first sheet was unwound from a portable unwind station and fed around rollers such that the smooth backside passed approximately 1 centimeter beneath the exit of the die lip. A second gas delivery layer sheet having protrusions on one side of the sheet was extruded using the method described above for the Gas Delivery Layer 1 onto the smooth backside of the first sheet such that the resulting dual-sided gas delivery layer had rail-like protrusions on both sides with a base layer thickness of about 305 microns (0.012 in), a rail height of about 965 microns (0.036 in), a rail thickness of about 356 microns (0.014 in), and a rail center-to-center spacing of about 991 microns (0.039 in). The dual-sided gas delivery layer had layers of ENGAGE 8100 resin approximately 127 microns (0.005 in) in thickness on the rail tips on both sides of the base layer.

EXAMPLE 1

A 76 micrometer thick sheet of microporous membrane material was prepared using a thermally induced phase separation technique comprising about 58.75 wt % polypropylene resin (from Union Carbide sold under the trade designation 5D45), 35.0 wt % mineral oil (from Amoco Oil Company sold under the trade designation White Mineral Oil #31 USP Grade), 4.0 wt % green pigment concentrate containing 25 wt % green #7 pigment (from PolyOne Company sold under the trade designation 10066064 FDA Green) and 2.25 wt % fluorocarbon ester (made as described in U.S. patent application Ser. No. 10,159,752 filed May 29, 2002). The fluorocarbon ester was made by the procedure described in U.S. application Ser. No. 10,159,752 for FC-425 at pages 27–28, incorporated herein by reference. In summary, toluene, $C_4F_9SO_2N(CH_3)CH_2CH_2OH$ (MeFBSE), citric acid, p-toluene sulfonic acid, and polyethylene alcohol (obtained as Unilin-425 105-OH equivalent weight from Baker Petrolite Corp., Sugar Land, Tex.) were mixed together. The mixture was heated at reflux for 15 hours. When the desired amount of water was collected in the Dean Stark trap (fitted to the reaction flask) the toluene was distilled off. When most of the toluene was distilled off, the molten product was poured into a pan and allowed to dry in an oven at 120° C. for 4 hours.

The structure of FC-425 is

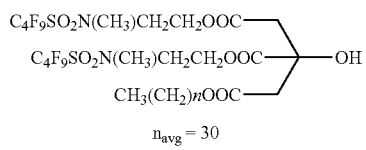

$n_{avg} = 30$

The composition for the microporous membrane was melt mixed at 9.08 Kg/hr in a 40 mm diameter corotating, twin screw extruder maintained at a decreasing temperature profile of 250° C. to 204° C. through a slip gap sheeting die having an orifice 38.1 cm×0.381 mm onto a casting wheel maintained at 60° C. The cast film was stretched in a continuous fashion in the machine direction 1.8:1 at 52° C. and in the cross web direction 1.8:1 at 107° C. and heat set at 130° C. The resultant microporous film had a surface energy less than 17 dynes/cm and a bubble point pore diameter of approximately 0.21 microns.

The low surface energy, microporous membrane was thermally laminated to a dual-sided gas delivery layer made using the method described above for Gas Delivery Layer 2. A roll of the dual-sided gas delivery layer was placed on a portable unwind station with an air brake to provide tension. A roll of the microporous membrane was placed on a portable unwind station with an air brake to provide tension to the film.

A series of idler rollers were used to establish a web path such that the microporous membrane and the dual-sided gas delivery layer made contact at a 2 o'clock position on a 30.5 cm (12 in) diameter chrome plated first nip roll. The nip roll was heated to approximately 74° C. (165° F.). The low melting point resin-containing tips of the rails located on the bottom surface of the gas delivery layer made contact with the microporous membrane with lamination occurring in about 60 degrees of wrap around the heated nip roll.

A second 30.5 cm (12 in) diameter chrome plated nip roll was located directly adjacent to the first nip roll. The second roll was heated to approximately 74° C. (165° F.). Both rolls were nipped together with a pressure of approximately 276 kPa (40 psi), using a gap setting of approximately 254 microns (0.010 in) less than the total thickness of the support sheet.

A second roll of the microporous membrane described above was unwound using a clutch to provide tension and fed into the nip between the two nip rolls such that the tips of the rails located on the top surface of the dual-sided support sheet made contact with the microporous film at approximately the 3 o'clock position of the first nip roll. The three layer laminate construction continued to make contact for approximately 90 degrees of wrap around the second nip roll. A strong bond of the microporous membranes to the dual-sided gas delivery layer resulted. The resulting membrane laminate comprised two microporous membrane sheets, having a surface energy less than 17 dynes/cm, bonded on either side of a gas delivery layer, the gas delivery layer comprising a flat base sheet with rail-like protrusions on both sides substantially perpendicular to the base sheet, the rail-like protrusions forming flow channels therebetween.

Pure mineral oil was poured onto the laminate and the time to wet-out the microporous membrane was measured. No membrane wetting by the oil was observed after 30 days.

COMPARATIVE EXAMPLE 1

A microporous membrane was made using a method identical to that described in Example 1, except no fluorocarbon ester was used. Pure mineral oil was poured onto the microporous membrane and the time to wet-out the microporous membrane was measured. The mineral oil was observed to wet the microporous membrane in less than 2 seconds.

EXAMPLE 2

A spunbond polypropylene nonwoven was affixed to the membrane laminate of Example 1 as a microbial support layer. The spunbond nonwoven (RFX-92268, Amoco Fabrics & Fibers Co., Austell, Ga.) had a thickness of approximately 84 microns, a basis weight of approximately 17.0 grams per square meter, and a mean fiber diameter of approximately 25.7 microns.

A piece of the membrane laminate from Example 1 having a length of approximately 35.6 cm (14 in) in the direction of the rails of the gas delivery layer, and a width of approximately 15.2 cm (6 in) in the direction perpendicular to the rails of the gas delivery layer, was cut out using a razor blade. A hot melt adhesive (SPRAY-BOND Adhesive 6111, 3M Corporation, St. Paul, Minn.) was applied to the surface of the microporous membrane on one side of the membrane laminate using a hand-held hot melt spray unit (PAM 600 SPRAYMATIC, Fastening Technology, Inc., Charlotte, N.C.), such that the hot melt adhesive formed fine fibers dispersed across the surface of the microporous membrane. A piece of the spunbond nonwoven was then placed flat on the side of the laminate having the hot melt adhesive, such that the nonwoven was permanently bonded to the microporous membrane.

Two approximately 40.6-cm lengths of PVC pipe having an inner diameter of 0.95 cm (0.375 in) were prepared, and each was sealed at one end. A slot approximately 15.2 cm (6 in) long and approximately 2 mm wide was cut lengthwise in each pipe starting approximately 2.5 cm from the sealed end. The membrane laminate was then inserted into the slots in the two pipes, such that a fluid connection between the interior of the pipes and the flow channels of the laminate was formed. Water-tight seals between the membrane laminate and the pipes were formed at the slots using a two-part epoxy (3M SCOTCH-WELD DP-104 adhesive, available from 3M Corporation, Maplewood, Minn.). The resulting membrane module comprised a membrane laminate comprising low surface energy microporous membranes on both sides, having on one side a nonwoven to serve as a microbial support layer, and manifold pipes on either end of the membrane laminate capable of providing gas flow through the flow channels of the laminate.

The membrane module was inserted into a cylindrical reactor containing 5 liters of a synthetic wastewater having the following composition: 7 g/l glucose, 3 g/l tryptone, 2.29 g/l ammonium chloride, 5 mg/l iron(II) chloride, 0.816 g/l potassium phosphate monobasic, 0.568 g/l sodium phosphate dibasic, 1.5 mg/l iron(II) chloride tetrahydrate, 0.06 mg/l boric acid, 0.1 mg/l manganese(II) chloride tetrahydrate, 0.12 mg/l cobalt(II) chloride hexahydrate, 0.07 mg/l zinc(II) chloride, 0.025 mg/l nickel(II) chloride hexahydrate, 0.015 mg/l copper(II) chloride dihydrate, and 0.025 mg/l sodium molybdate dihydrate. Deionized water was used for the water phase. The membrane module was installed in the cylindrical reactor such that the manifold pipes stood vertically approximately 2.5 cm (1 in) from one side of the cylindrical reactor and separated from one another by approximately 5.1 cm (2 in). The membrane laminate was bowed within the reactor such that it did not contact the side of the reactor, with the side of the membrane laminate comprising the nonwoven microbial support layer facing inward toward the center of the reactor. The reactor was connected to a standard pH probe and pH meter set to prevent the pH of the solution from dropping below 6.7 by injecting a 1 molar solution of sodium bicarbonate dropwise by means of a pump connected to the pH meter. Sterile synthetic wastewater having the above composition was continuously injected dropwise into the reactor at a rate of 0.116 milliliters per minute, and fluid was withdrawn from the reactor at the same rate to provide a reactor hydraulic retention time of 30 days. An air hose was connected to one pipe of the membrane module and air was provided to the membrane module at a rate of approximately 4 standard liters per minute, creating a pressure drop across the membrane module of approximately 50 mm of water. The solution in the reactor was seeded with bacteria taken from the activated sludge tank of a municipal wastewater treatment plant (Empire Wastewater Treatment Plant, Empire Township, Minn.) and stirred with a magnetic stir plate.

After 35 days of immersion in the synthetic wastewater, the membrane module was removed, and a microbial film was observed on the laminate surface on the side having the nonwoven microbial support layer. A sample of the laminate was cut from the membrane module while it was still wet. Living bacterial cells on the laminate were stained using a fluorescent stain (LIVE/DEAD BACLIGHT Bacterial Viability Kit L-13152 available from Molecular Probes, Inc., Eugene, Oreg.). The stained sample was cross-sectioned using a razor blade, and the cross-section was imaged with a laser scanning biological microscope (Olympus FV300, Olympus America, Inc., Melville, N.Y.), using an excitation wavelength of approximately 480 nm and an emission wavelength of approximately 500 nm. A microbial layer containing stained, living bacteria was observed to have colonized the entire thickness of the nonwoven microbial support layer.

Use of the preferred gas permeable layers in accordance with this invention permits gas transport while resisting membrane wet-out due to the presence of low surface energy fluids like oils, grease and surfactant-like molecules. Additionally, use of the gas permeable layer described permits microbial attachment and growth upon the surface of the gas permeable layer 12, and effective treatment of wastewater by microbial population 29. The discovery that the low surface energy of the gas permeable layer is capable of (1) sustaining microbial growth and metabolism, and (2) sustaining microbial transformation without a reduction in microbial activity are added benefits of the invention permitting efficient treatment when using the gas delivery constructions of the present invention in MABRs.

Although the present invention has been described with reference to preferred embodiments, workers skilled in the art will recognize that changes may be made in form and detail without departing from the spirit and scope of the invention.

What is claimed is:

1. A layered sheet construction comprising:
   a. at least one gas permeable, liquid water impermeable microporous layer characterized by containing or having on the surface thereof a fluorine-containing material selected from the group consisting of
      i) polymers onto which fluorine-containing groups are grafted; and
      ii) macromolecular additives comprising the reaction product of one or more aliphatic polyfunctional compounds having reactive hydroxyl and/or acyl functional groups, one or more fluorochemical monofunctional compounds and optionally one or more aliphatic monofunctional compounds having 12 to 72 carbon atoms; and
      a surface energy less than about 17 dynes/cm; and
   b. a gas delivery layer bonded to the layer of part a. which gas delivery layer has a plurality of walls integral with and extending substantially perpendicularly from a polymeric base sheet or currugations forming separate flow channels through which gas can be conveyed to the layer of part a.; and
   c. a mass of microorganisms proximate the layer of part a.

2. The layered sheet construction of claim 1 in which the layer of part a. has an average pore size of less than 0.5 micrometers.

3. The layered sheet construction of claim 1 of which the gas permeable, liquid water impermeable layer of part a. comprises a polymer selected from the group consisting of polytetrafluoroethylene, vinyl polymers, polyamides, polyurethanes, polypropylene, polyethylene, polysulfones and poly(ethersulfones), and copolymers thereof.

* * * * *

UNITED STATES PATENT AND TRADEMARK OFFICE
CERTIFICATE OF CORRECTION

| | | |
|---|---|---|
| PATENT NO. | : 7,114,621 B2 | Page 1 of 1 |
| APPLICATION NO. | : 10/437799 | |
| DATED | : October 3, 2006 | |
| INVENTOR(S) | : Jonathan F. Hester | |

It is certified that error appears in the above-identified patent and that said Letters Patent is hereby corrected as shown below:

<u>Title Page (56) pg 2 col. 1</u>
Line 7, under Other Publications, delete the word "Fibre" and insert in place thereof
-- Fiber --.
Line 7, under Other Publication, delete the word "Bioractor" and insert in place thereof
-- Bioreactor --.

<u>Title page (56) pg 2 col. 2  Other Publications</u>
Line 3, Column 2, delete the word "D' Augstino" and insert in place thereof -- D' Agustino --.
Line 17, Column 2, delete the word "Frafting" and insert in place thereof -- Grafting --.
Line 21, Column 2, delete the word "hydrophoilic" and insert in place thereof
-- hydrophilic --.
Line 25, Column 2, delete the word "Irradition" and insert in place thereof
-- Irradiation --.

<u>Column 8</u>
Line 39, delete the word "polypropyelene" and insert in place thereof
-- polypropylene --.

<u>Column 14</u>
Line 42, delete the word "currugations" and insert in place thereof -- corrugations --.

Signed and Sealed this

Ninth Day of January, 2007

JON W. DUDAS
*Director of the United States Patent and Trademark Office*